United States Patent
Ohtake et al.

(10) Patent No.: US 12,460,703 B2
(45) Date of Patent: Nov. 4, 2025

(54) WORM REDUCER CAPABLE OF GUILDING LUBRICANT TO MAINTAIN FUNCTION

(71) Applicant: HONDA MOTOR CO., LTD., Tokyo (JP)

(72) Inventors: Sho Ohtake, Tokyo (JP); Takashi Miyoshi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 75 days.

(21) Appl. No.: 18/365,229

(22) Filed: Aug. 4, 2023

(65) Prior Publication Data
US 2024/0102539 A1 Mar. 28, 2024

(30) Foreign Application Priority Data
Sep. 28, 2022 (CN) .......................... 202211191280.X

(51) Int. Cl.
| | | |
|---|---|---|
| F16H 57/04 | (2010.01) | |
| F16H 19/08 | (2006.01) | |
| F16H 57/039 | (2012.01) | |
| B62D 5/04 | (2006.01) | |

(52) U.S. Cl.
CPC .......... F16H 19/08 (2013.01); F16H 57/039 (2013.01); F16H 57/0421 (2013.01); F16H 57/0498 (2013.01); B62D 5/0403 (2013.01)

(58) Field of Classification Search
CPC .... F16H 19/08; F16H 57/039; F16H 57/0421; F16H 57/0498; B62D 5/0403
See application file for complete search history.

(56) References Cited

U.S. PATENT DOCUMENTS

2007/0240536 A1* 10/2007 Murakami .......... F16H 57/0427
74/606 R
2020/0309250 A1* 10/2020 Yen ..................... F16H 57/0498

FOREIGN PATENT DOCUMENTS

JP      2012207737 A    10/2012
WO   WO-2024209631 A1 * 10/2024

OTHER PUBLICATIONS

WO2024/209631 (Year: 2024).*

* cited by examiner

*Primary Examiner* — Minnah L Seoh
*Assistant Examiner* — Gregory T Prather
(74) *Attorney, Agent, or Firm* — CKC & PARTNERS CO., LLC

(57) ABSTRACT

A worm reducer 1, in which at least one of an upper surface part or a lower surface part of a housing includes a protruding part 20 protruding toward a worm wheel 60; and with respect to an imaginary line L1 extending parallel to the rotation axis C2 of a worm gear 50 and passing through the central axis of a shaft 71 in the housing, a protruding part 20 is provided between an imaginary line L1 and a meshing part E between the worm gear 50 and the worm wheel 60 in a plan view, and includes an inclined part 21 that inclines toward the meshing part E.

10 Claims, 9 Drawing Sheets

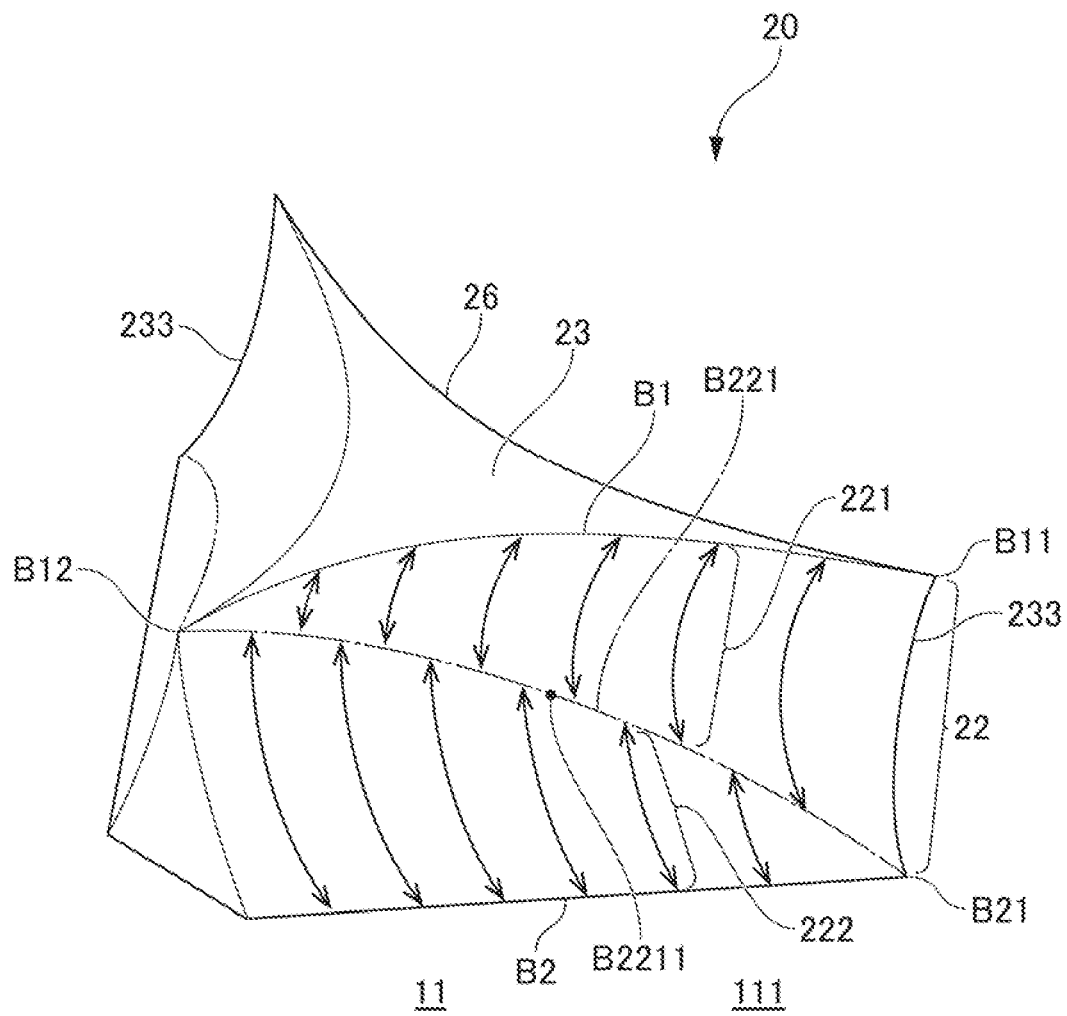

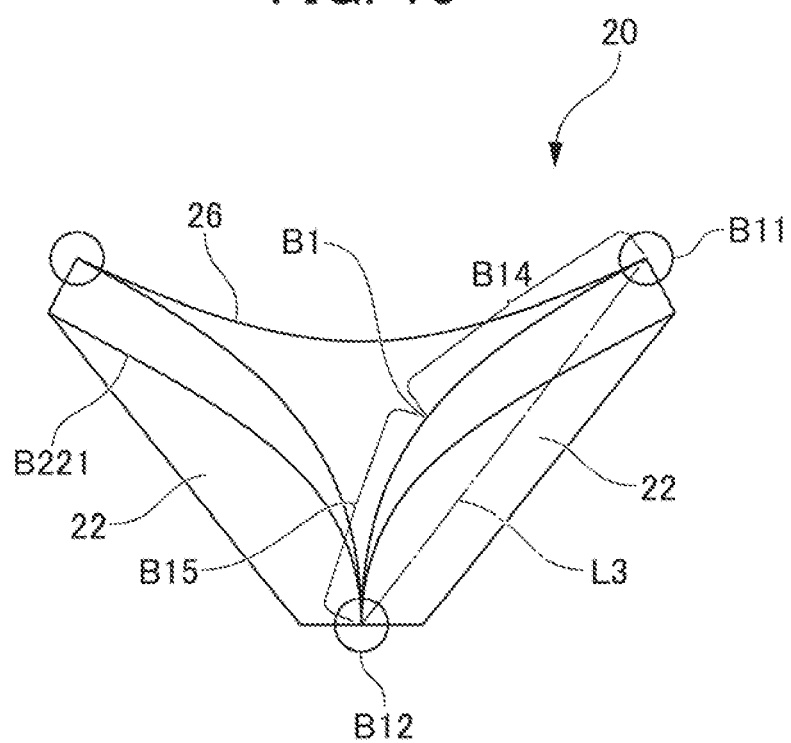

WORM REDUCER CAPABLE OF GUILDING LUBRICANT TO MAINTAIN FUNCTION

This application is based on and claims the benefit of priority from Chinese Patent Application No. CN202211191280.X, filed on 28 Sep. 2022, the content of which is incorporated herein by reference.

BACKGROUND OF THE INVENTION

Field of the Invention

The present invention relates to a worm reducer.

Related Art

It has been known to provide a worm reducer in vehicles, which includes a meshing part where a worm gear and a worm wheel mesh. In the meshing part between the worm gear and the worm wheel, lubricant such as grease is filled to suppress wear of the tooth parts; however, due to long-term use or changes in the operating environment, the lubricant can accumulate at the top of the worm wheel, resulting in a shortage of lubricant in the meshing part. When the lubricant is insufficient, abnormal noise can occur in the meshing part, or discomfort can be felt when operating the steering wheel connected to the worm gear, which can cause an uncomfortable feeling to the vehicle occupants. Therefore, a configuration to solve the aforementioned problems has been disclosed, in which a pulley device is provided at the top of the worm wheel, and the belt connecting the pulley is rotated, thereby scraping out the accumulated lubricant (refer to Patent Document 1, for example).

Patent Document 1: Japanese Unexamined Patent Application, Publication No. 2012-207737

SUMMARY OF THE INVENTION

In the prior art described above, a large-scale structure is used in which the belt connecting the pulley rotates, resulting in a complex configuration and higher manufacturing costs for the worm reducer. Further, although the lubricant biased in the pulley device can be stirred, the lubricant cannot be guided to the meshing part between the worm gear and the worm wheel.

The objective of the present invention is to provide a worm reducer, in which a protruding part allows lubricant to be guided toward a meshing part between a worm gear and a worm wheel, in which the functions of the worm reducer are maintained in an appropriate state, whereby contributing to the development of a sustainable transport system and allowing for further improvement of traffic safety.

In order to solve the aforementioned problems, the present invention provides a worm reducer (e.g., worm reducer 1 to be described), including: a housing (e.g., housing 10 to be described) filled with grease that lubricates the worm reducer; a worm gear (e.g., worm gear 50 to be described) supported by a bearing (e.g., bearing 131 to be described) in the housing; a worm wheel (e.g., worm wheel 60 to be described) that meshes with the worm gear; and a shaft (e.g., shaft 71 to be described) that composes an axis of the worm wheel; in which the housing includes an upper surface part (e.g., upper surface part 11 to be described) and a lower surface part (e.g., lower surface part 12 to be described) that faces parallel to the upper surface part by interposing the worm wheel; at least one of the upper surface part or the lower surface part includes a protruding part (e.g., protruding part 20 to be described) protruding toward the worm wheel; and with respect to an imaginary line extending parallel to a rotation axis (e.g., rotation axis C2 to be described) of the worm gear and passing through a central axis (e.g., central axis C1 to be described) of the shaft in the housing, the protruding part includes an inclined part provided between the imaginary line and a meshing part (e.g., meshing part E to be described) between the worm gear and the worm wheel in a plan view, the inclined part inclining toward the meshing part.

In this case, the protruding part preferably includes a guide part (e.g., guide part 22 to be described) that guides lubricant toward the worm gear.

In this case, the protruding part preferably includes a bottom part (e.g., bottom part 23 to be described) protruding from the guide part toward a side of the shaft, and the guide part is preferably positioned between the bottom part and the upper or lower surface part, and preferably includes a first guide part (e.g., first guide part 221 to be described) on a side of the bottom part and a second guide part (e.g., second guide part 222 to be described) on a side of the upper or lower surface part.

In this case, in the guide part, curvature of the first guide part is preferably larger than curvature of the second guide part on a side of the shaft, and the curvature of the second guide part is preferably larger than the curvature of the first guide part on a side of the worm gear.

In this case, preferably, the closer to the worm gear, the larger a proportion of an area of the second guide part to a proportion of an area of the first guide part.

In this case, the protruding part preferably includes: an edge part (e.g., edge part B1, B2 to be described) where the bottom part and the guide part intersect; a first end part (e.g., first end part B11 to be described) that is an end on a side of the shaft of the edge part; and a second end part (e.g., second end part B12 to be described) that is an end on a side of the worm gear of the edge part, in which the protruding part is preferably curved toward a side of the central axis of the shaft from an imaginary line (e.g., imaginary line L3 to be described) connecting the first end part and the second end part.

In this case, the edge part preferably includes at least two sections having different curvatures, and curvature of the section of the edge part including the first end part is preferably larger than curvature of the section of the edge part including the second end part.

In this case, the protruding part preferably includes a wall part (e.g., wall part 26 to be described) that extends in a direction away from the worm wheel, from an apex (e.g., apex 231 to be described) of the bottom part, on a side of the central axis of the shaft.

In this case, the wall part is preferably curved in a direction away from the central axis. In this case, a pair of ends connecting the guide part and the wall part are preferably positioned outward from an outer circumference of the shaft. In this case, ends connecting the guide part and the wall part are preferably positioned outward from ends of the meshing part between the worm gear and the worm wheel.

In order to solve the aforementioned problems, the present invention provides a worm reducer (e.g., worm reducer 1 to be described), including: a housing (e.g., housing 10 to be described) filled with grease that lubricates the worm reducer; a worm gear (e.g., worm gear 50 to be described) supported by a bearing (e.g., bearing 131 to be described) in the housing; a worm wheel (e.g., worm wheel 60 to be described) that meshes with the worm gear; and a shaft (e.g., shaft 71 to be described) that composes an axis of the worm wheel; in which the housing includes an upper surface part (e.g., upper surface part 11 to be described) and a lower surface part (e.g., lower surface part 12 to be described) that faces parallel to the upper surface part by interposing the worm wheel; at least one of the upper surface part or the lower surface part includes a protruding part (e.g., protruding part 20 to be described) protruding toward the worm wheel; and with respect to an imaginary line (e.g., imaginary line L2 to be described) extending parallel to a rotation axis (e.g., rotation axis C2 to be described) of the worm gear and passing through a central axis (e.g., central axis C1 to be described) of the shaft in the housing, the protruding part is provided closer to a side of the worm gear than the central axis of the shaft in a plan view, and the protruding part is at least partly arranged on the imaginary line.

According to the present invention, a worm reducer can be provided, in which a protruding part allows lubricant to be guided toward a meshing part between a worm gear and a worm wheel, in which the functions of the worm reducer are maintained in an appropriate state, whereby contributing to the development of a sustainable transport system and allowing for further improvement of traffic safety.

BRIEF DESCRIPTION OF THE DRAWINGS

FIG. 9 is a diagram for illustrating the shape of the curved surface of the guide part of the protruding part of the worm reducer as an embodiment of the present invention; and FIG. 10 is a diagram for illustrating the shape of the protruding part of the worm reducer as an embodiment of the present invention.

DETAILED DESCRIPTION OF THE INVENTION

Figure 1:
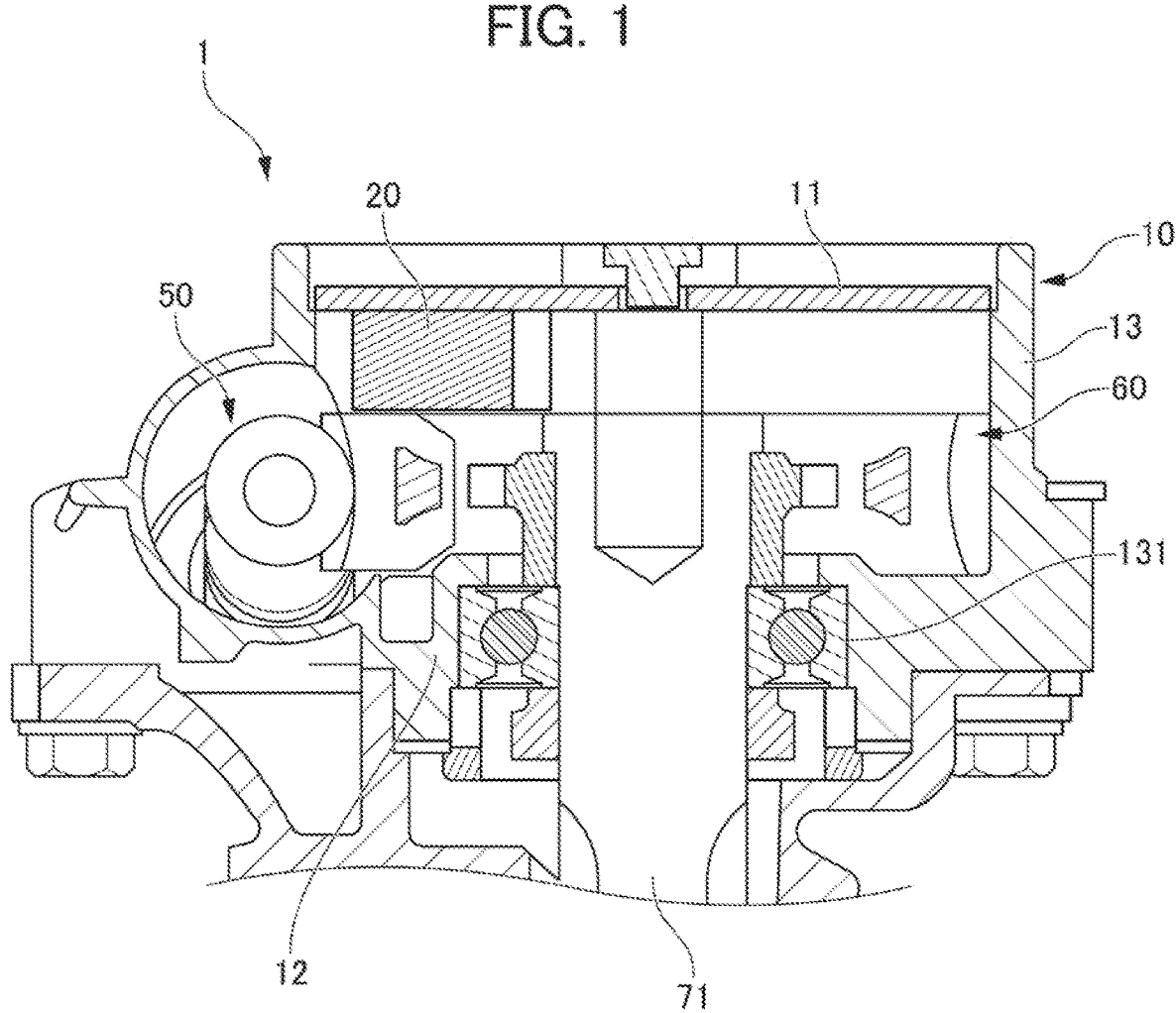
FIG. 1 is a sectional view illustrating a worm reducer as an embodiment of the present invention.
Figure 2:
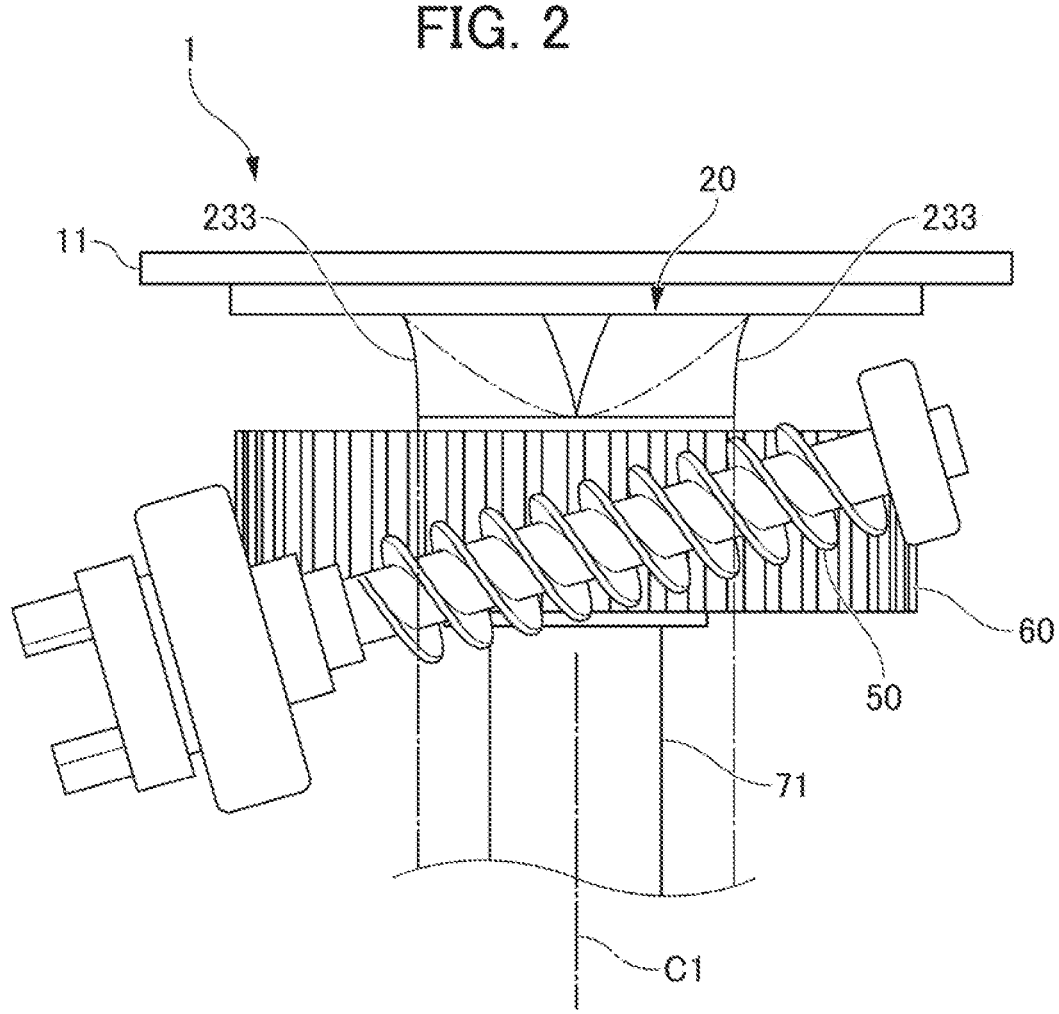
FIG. 2 is a diagram for illustrating the worm reducer as an embodiment of the present invention.

Hereinafter, embodiments of the present invention will be described in detail with reference to the drawings. FIG. 1 is a sectional view illustrating a worm reducer 1. FIG. 2 is a diagram for illustrating the worm reducer 1.

The worm reducer 1 in the present embodiment constitutes an electric power steering device (EPS) provided in a vehicle, and the worm reducer 1 includes: a worm gear 50 that rotates when an unillustrated steering wheel is rotated; a worm wheel 60 that meshes with the worm gear 50; and a housing 10 that houses the worm gear 50 and the worm wheel 60. Grease is filled in the housing 10 to lubricate the meshing between the worm gear 50 and the worm wheel 60. The rotation due to the operation of the unillustrated steering wheel is transmitted from the worm gear 50 to the worm wheel 60, whereby the steering wheel of the vehicle is steered.

As illustrated in FIG. 1, the housing 10 includes an upper surface part 11, a lower surface part 12 that faces parallel to the upper surface part 11 by sandwiching the worm wheel 60 (refer to FIG. 8, etc.), and an intermediate part 13 arranged between the upper surface part 11 and the lower surface part 12. A bearing 131 is provided in the intermediate part 13. The worm wheel 60 is rotatably supported through the bearing 131 in the intermediate part 13. The shaft 71 is rotatably supported. The worm wheel 60 is fixed to the upper end of the shaft 71, and the shaft 71 constitutes the axis of the worm wheel 60. The shaft 71 is configured to be integrally rotatable with the worm wheel 60. An unillustrated bearing is also provided in the housing 10, and the worm gear 50 is rotatably supported through the unillustrated bearing in the housing 10. The worm wheel 60 meshes with the worm gear 50, which are stored in the storage space filled with grease and surrounded by the upper surface part 11, the lower surface part 12, and the intermediate part 13.

Figure 7:
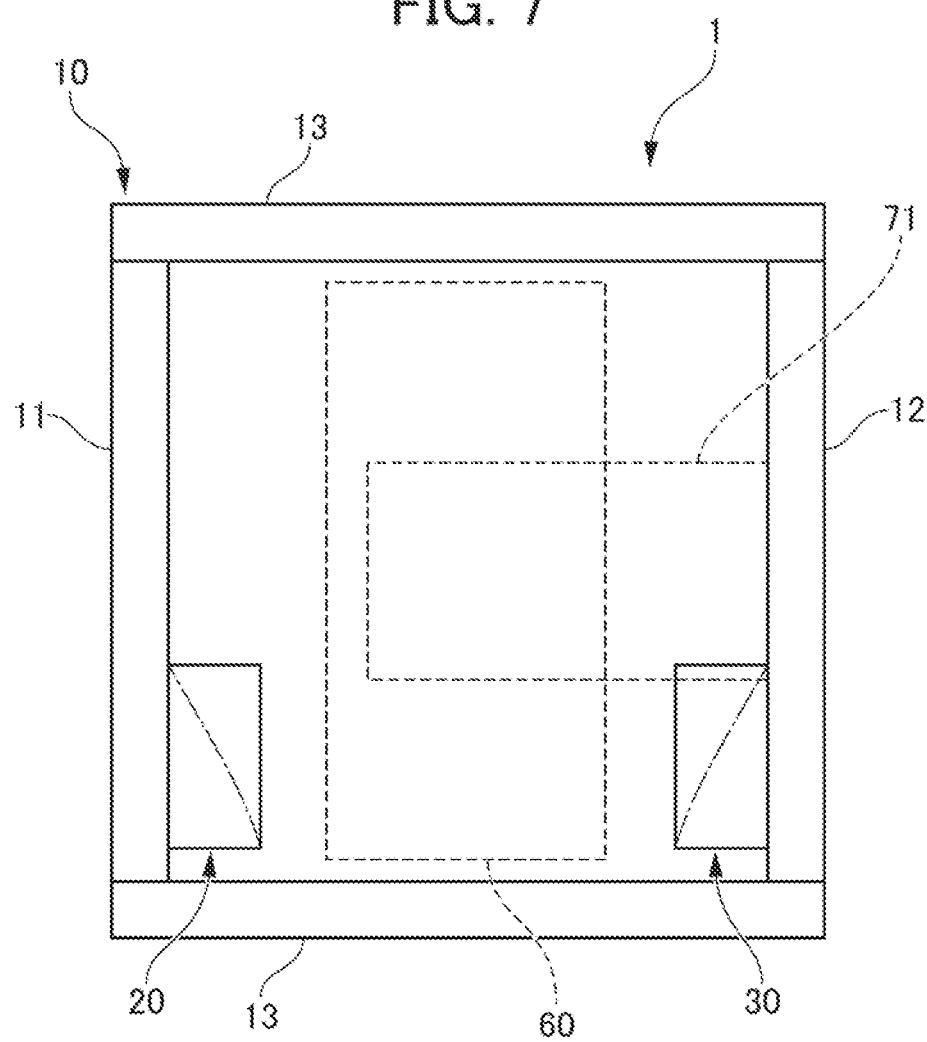
FIG. 7 is a schematic side view illustrating the worm reducer as an embodiment of the present invention.

Protruding parts 20 and 30 are provided on the upper surface part 11 and the lower surface part 12, respectively. As illustrated in FIG. 7, etc., the protruding parts 20 and 30 are symmetrically configured like a mirror image by sandwiching the worm wheel 60; however, only the protruding part 20 of the upper surface part 11 will be described below, and the description of the protruding part 30 will be omitted.

Figure 3:
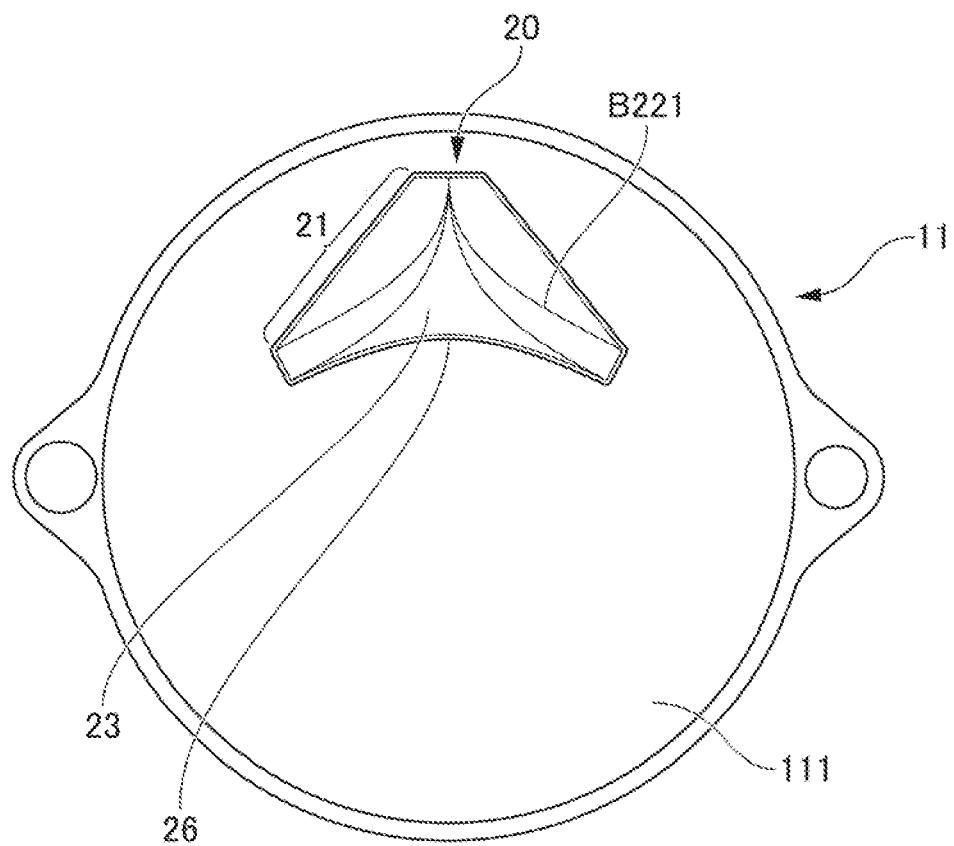
FIG. 3 is a diagram for illustrating an upper surface part of a housing of the worm reducer as an embodiment of the present invention.
Figure 4:
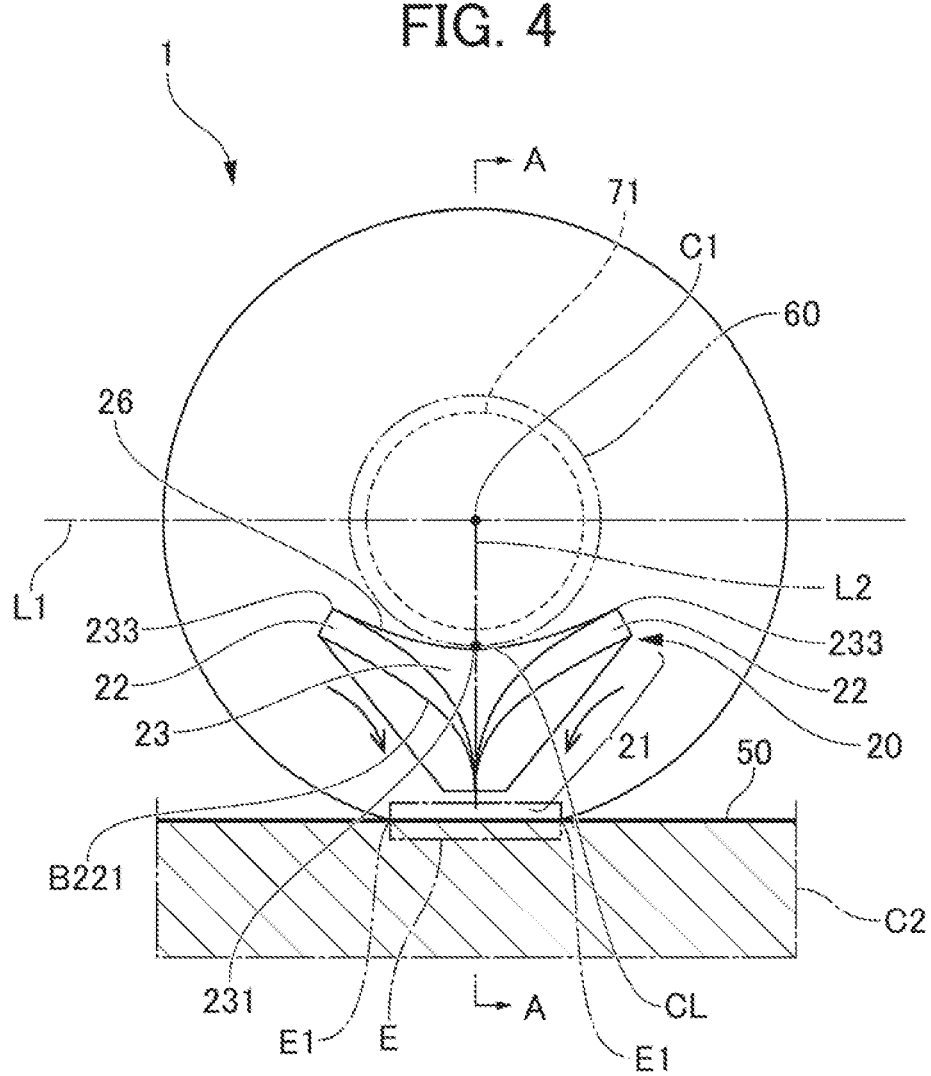
FIG. 4 is a schematic plan view for illustrating the positional relationship between a worm wheel, a worm gear, and a protruding part of the worm reducer as an embodiment of the present invention.
Figure 5:
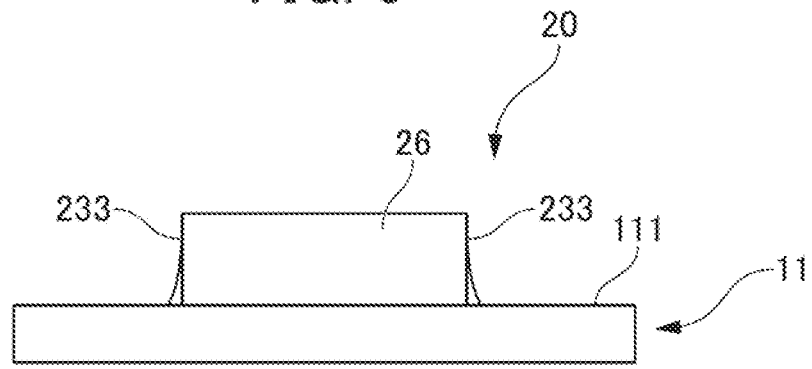
FIG. 5 is a schematic side view from the shaft side of the worm wheel, illustrating the upper surface part of the housing of the worm reducer as an embodiment of the present invention.
Figure 6:
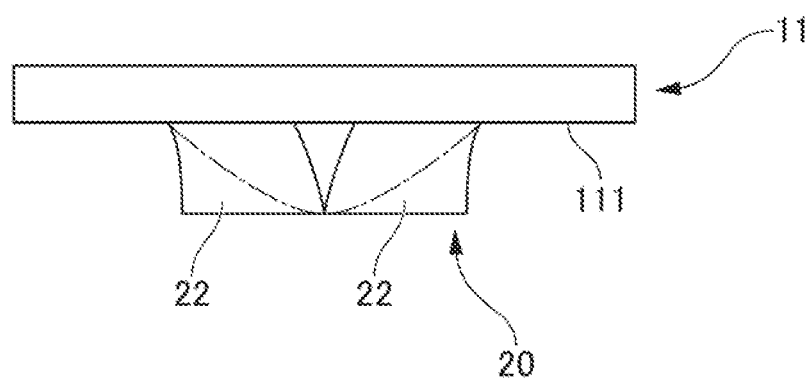
FIG. 6 is a schematic side view from the protruding part side, illustrating the upper surface part of the housing of the worm reducer as an embodiment of the present invention.
Figure 8:
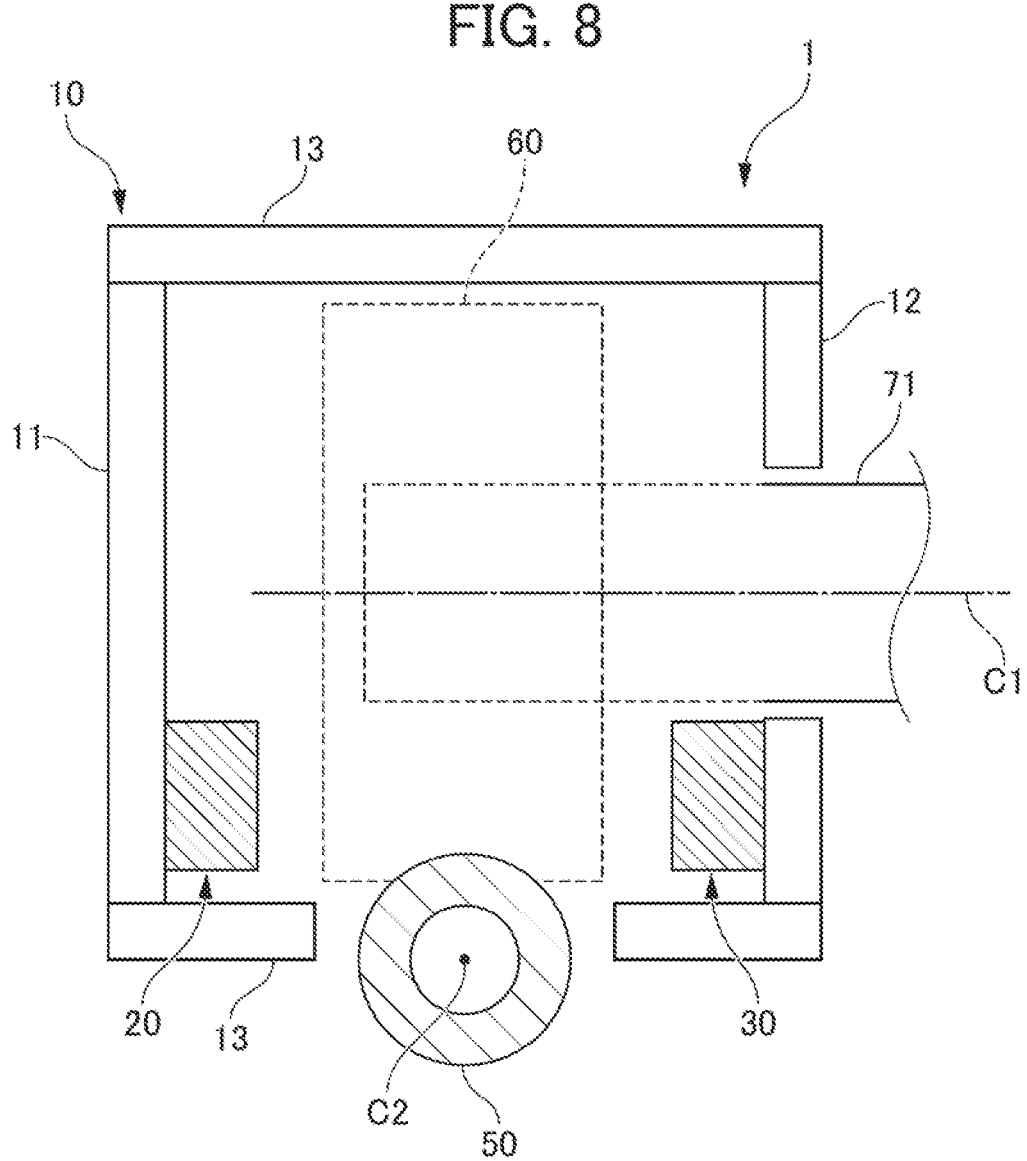
FIG. 8 is a schematic sectional view illustrating the worm reducer as an embodiment of the present invention.

FIG. 3 is a diagram for illustrating the upper surface part 11 of the housing 10 of the worm reducer 1. FIG. 4 is a schematic plan view for illustrating the positional relationship between the worm wheel 60, the worm gear 50, and the protruding part 20 of the worm reducer 1. FIG. 5 is a schematic side view of the upper surface part 11 of the housing 10 of the worm reducer 1, as viewed from the shaft 71 side of the worm wheel 60. FIG. 6 is a schematic side view of the upper surface part 11 of the housing 10 of the worm reducer 1, as viewed from the protruding part 20 side. FIG. 7 is a schematic side view illustrating the worm reducer 1. FIG. 8 is a schematic sectional view illustrating the worm reducer 1. FIG. 9 is a diagram for illustrating the shape of the curved surface of the guide part 22 of the protruding part 20 of the worm reducer 1. FIG. 10 is a diagram for illustrating the shape of the protruding part 20 of the worm reducer 1.

The protruding part 20 protrudes from the inner surface 111 of the upper surface part 11 toward the inside of the housing 10, more specifically, toward the worm wheel 60. In the housing 10, when a straight line extending parallel to the rotation axis C2 of the worm gear 50 and passing through the central axis C1 of the shaft 71 is taken as an imaginary line L1, in the plan view illustrated in FIG. 4, the protruding part 20 is provided in a position between the imaginary line L1 and the meshing part E of the worm gear 50 and the worm wheel 60.

As illustrated in FIG. 4, etc., the protruding part 20 includes an inclined part 21, a guide part 22, and a bottom part 23. The inclined part 21 slopes toward the meshing part E between the worm gear 50 and the worm wheel 60, as viewed in a direction of the plan view. Here, the slope of the inclined part 21 refers to a flat or curved surface approaching the worm gear 50, not parallel to the rotation axis C2 of the worm gear 50. That is, the inclined part 21 may be composed of an inclined surface constituted by a flat surface, or may be composed of a curved surface. In the plan view illustrated in FIG. 4, as the inclined part 21 gets closer to the imaginary line L1, the inclined part 21 is curved so as to separate from the worm wheel 60 in the direction from the meshing part E along the rotation axis C2 of the worm gear 50. In the plan view illustrated in FIG. 4, the inclined part 21 is curved so as to approach the meshing part E as the inclined part 21 gets closer to the worm gear 50.

As illustrated in FIG. 4, in the housing 10, when a straight line extending in a direction perpendicular to the rotation axis C2 of the worm gear 50 and passing through the central axis C1 of the shaft 71 is taken as an imaginary line L2, the protruding part 20 is provided closer to the worm gear 50 side than the central axis C1 of the shaft 17 in a plan view, and the protruding part 20 is partly arranged on the imaginary line L2.

As illustrated in FIG. 9, in the protruding part 20, the guide part 22 is constituted by a side surface rising from the inner surface 111 of the upper surface part 11. The pair of guide parts 22 are symmetrically arranged in FIG. 4, based on an imaginary central line (imaginary line L2) extending toward the worm gear 50 and perpendicular to the central axis C1 of the shaft 71. Since the worm reducer 1 serves as a component that repeats forward and reverse rotations in the EPS, the symmetrical arrangement of the guide parts 22 as described above can deal with either rotation. As illustrated in FIG. 4, the bottom part 23 is constituted by a part protruding from the guide part 22 toward the shaft 71.

Specifically, as illustrated in FIG. 9, the guide part 22 includes a first guide part 221 and a second guide part 222. That is, when the end part on the shaft 71 side (refer to FIG. 4) of an edge part B1 where the bottom part 23 and the guide part 22 intersect is a first end part B11, the end part on the worm gear 50 side (refer to FIG. 4) of the edge part B1 where the bottom part 23 and the guide part 22 intersect is a second end part B12, and the end part on the shaft 71 side (refer to FIG. 4) of an edge part B2 where the guide part 22 and the inner surface 111 of the upper surface part 11 intersect is a third end part B21, part of the guide part 22 on the bottom part 23 side from the imaginary boundary line B221 constitutes the first guide part 221, in which the imaginary boundary line B221 connects the second end part B12 as the end part on the worm gear 50 side of the edge part B1 where the bottom part 23 and the guide part 22 intersect, and the third end part B21 as the end part on the shaft 71 side of the edge part B2 where the guide part 22 and the inner surface 111 of the upper surface part 11 intersect. Part of the upper surface part 11 on the inner surface 111 side from the imaginary boundary line B221 constitutes the second guide part 222.

The first guide part 221 and the second guide part 222 are each constituted by a curved surface. In the guide part 22, the curvature of the first guide part 221 increases as the first guide part 221 gets closer to the shaft 71 side, that is, the third end part B21. The curvature of the first guide part 221 is greater than the curvature of the second guide part 222, on the side closer to the third end part B21 than a midpoint B2211 between the second end part B12 and the third end part B21. In the guide part 22, the curvature of the second guide part 222 increases as the second guide part 222 gets closer to the worm gear 50 side, that is, the second end part B12. The curvature of the second guide part 222 is greater than the curvature of the first guide part 221, on the side closer to the second end part B12 than the midpoint B2211.

When the unit area ratio of the first guide part 221 is compared with the unit area ratio of the second guide part 222 in the direction along the imaginary boundary line B221, the unit area ratio of the second guide part 222 in relation to the unit area ratio of the first guide part 221 increases as it gets closer to the worm gear 50. In other words, as illustrated in FIG. 9, at a certain position on the imaginary boundary line B221, when the length from the imaginary boundary line B221 to the edge part B1 in the first guide part 221 (the length of the arrow above the imaginary boundary line B221 in FIG. 9) is compared with the length from the imaginary boundary line B221 to the edge part B2 in the second guide part 222 (the length of the arrow below the imaginary boundary line B221 in FIG. 9), the second guide part 222 becomes longer than the first guide part 221 as it gets closer to the second end part B12 that is the end part on the worm gear 50 side. The first guide part 221 becomes longer than the second guide part 222 as it gets closer to the third end part B21 that is the end part on the shaft 71 side.

As illustrated in FIG. 10, the protruding part 20 is curved toward the central axis C1 of the shaft 71 (refer to FIG. 4) from the imaginary line L3 connecting the first end part B11 and the second end part B12. As illustrated in FIG. 10, the edge part B1 is constituted by a curve that includes sections B14 and B15 having two different curvatures. The curvature of the section B14 of the edge part B1 including the first end part B11 is larger than the curvature of the section B15 of the edge part B1 including the second end part B12.

The protruding part 20 includes a wall part 26. As illustrated in FIG. 4, the wall part 26 is formed so as to be curved from the apex (center point) 231 of the bottom part 23 in a direction away from the worm wheel 60, on the central axis C1 side of the shaft 71. Therefore, the wall part 26 is curved so as to sink in the direction away from the central axis C1. A small clearance CL is formed between the wall part 26 and the shaft 71. The clearance CL may not be formed.

An end part 233, which is composed of a pair of end edges connecting the guide part 22 and the wall part 26 (refer to FIGS. 2 and 5), is positioned outward from the central axis C1 of the shaft 71, beyond the outer circumference of the shaft 71. Similarly, the end part 233, which is composed of a pair of end edges connecting the guide part 22 and the wall part 26 (refer to FIG. 4), is positioned outward from the central axis C1 of the shaft 71, beyond the ends E1 of the meshing part E between the worm gear 50 and the worm wheel 60.

According to the present embodiment, the following effects can be achieved. In the present embodiment, the protruding part 20 is provided in the position between the imaginary line L1 and the meshing part E of the worm gear 50 and the worm wheel 60 in a plan view, and the protruding part 20 includes the inclined part 21. The protruding part 20 is provided closer to the worm gear 50 side than the central axis C1 of the shaft 71 in a plan view, and the protruding part 20 is partly arranged on the imaginary line L2. As a result, with a simple structure, lubricant staying in the worm wheel 60 on the sides each facing the upper surface part 11 and the lower surface part 12 can be guided toward the meshing part E between the worm gear 50 and the worm wheel 60, and lubrication failure at the meshing part E can be prevented. As a result, product quality can be improved.

In the present embodiment, the protruding part 20 includes the guide part 22 that guides lubricant toward the worm gear 50. Thus, the biased lubricant around the protruding part 20 can be guided to the worm gear 50 as indicated by the arrows in FIG. 4, which in turn can improve the product quality.

In the present embodiment, the protruding part 20 includes the bottom part 23 that protrudes from the guide part 22 toward the shaft 71 side, in which the guide part 22 is positioned between the bottom part 23 and the upper surface part 11 and includes the first guide part 221 on the bottom part 23 side and the second guide part 222 on the upper surface part 11 side. In the guide part 22, the curvature of the first guide part 221 is larger than the curvature of the second guide part 222, on the side closer to the third end part B21 or the shaft 71 side beyond the midpoint B2211. In the guide part 22, the curvature of the second guide part 222 is larger than the curvature of the first guide part 221, on the side closer to the second end part B12 or the worm gear 50 side beyond the midpoint B2211. Thus, the position for guiding the lubricant can be controlled by varying the curvature of the guide part 22, which in turn can improve the product quality.

In the present embodiment, when the ratio of the unit area of the first guide part 221 is compared with the ratio of the unit area of the second guide part 222 in the direction along the imaginary boundary line B221, the ratio of the unit area of the second guide part 222 in relation to the unit area of the first guide part 221 increases as it gets closer to the worm gear 50.

Thus, the section having a sharp curvature in the first guide part 221 can be small near the second end part B12 near the worm gear 50 by varying the curvature of the guide part 22, and the position for guiding the lubricant can be controlled. As a result, the product quality can be improved. Conversely, in the portion away from the worm gear 50, the section having a sharp curvature in the second guide part 222 can be increased, thus lubricant can be easily scraped in.

In the present embodiment, as illustrated in FIG. 10, the protruding part 20 curves toward the central axis C1 side of the shaft 71 (refer to FIG. 4) from the imaginary line L3 connecting the first end part B11 and the second end part B12. As a result, as illustrated in FIG. 4, the bottom part 23 is provided so as to curve in a shape of an arrowhead that narrows and tapers toward the imaginary center line (imaginary line L2) that is perpendicular to the central axis C1 of the shaft 71 between the pair of guide parts 22 and extending toward the worm gear 50, whereby the lubricant can be guided to the worm gear 50 as indicated by the arrows in FIG. 4, which in turn can improve the product quality.

In the present embodiment, as illustrated in FIG. 10, the edge part B1 is composed of a curve including the two sections B14 and B15 having different curvatures. The curvature of the section B14 of the edge part B1 including the first end part B11 is larger than the curvature of the section B15 of edge part B1 including the second end part B12. The position for guiding the lubricant can be controlled by varying the curvature of the guide part 22 along the direction of the edge part B1, which in turn can improve the product quality.

In the present embodiment, as illustrated in FIG. 4, the protruding part 20 includes the wall part 26 that curves in the direction away from the worm wheel 60, in terms of the apex (center point) 231 of the bottom part 23 on the central axis C1 side of the shaft 71. The wall part 26 curves in the direction away from the central axis C1. As a result, interference between the protruding part 20 and the shaft 71 can be avoided, which in turn can improve layout properties.

In the present embodiment, the end part 233 (refer to FIGS. 2 and 5), which is constituted by a pair of end edges connecting the guide part 22 and the wall part 26, is positioned outward from the outer circumference of the shaft 71, in relation to the central axis C1 of the shaft 71. The end part 233 (refer to FIG. 4), which is configured by a pair of end edges connecting the guide part 22 and the wall part 26, is positioned outward from the ends E1 of the meshing part E between the worm gear 50 and the worm wheel 60, in relation to the central axis C1 of the shaft 71. Thus, the lubricant can be efficiently guided by using the wide end part 233 of the guide part 22, which in turn can improve the product quality.

The present invention is not limited to the above-described embodiments and can be variously modified without departing from the spirit thereof. For example, the configuration of each part such as the housing, the worm gear, the worm wheel, and the protruding part is not limited to the configuration of the housing 10, the worm gear 50, the worm wheel 60, and the protruding part 20 in the present embodiment.

In the present embodiment, two protruding parts 20 and 30 are provided; however, the present invention is not limited thereto. The protruding part may be provided on at least one of the upper surface part or the lower surface part.

In the present embodiment, the edge part B1 is composed of a curve including the two sections B14 and B15 having different curvatures; however, the present invention is not limited thereto. For example, the edge part may be composed of a curve including three or more sections having different curvatures, or may be composed of at least one curve and one straight line in combination.

EXPLANATION OF REFERENCE NUMERALS

1 . . . worm reducer
10 . . . housing
11 . . . upper surface part
12 . . . lower surface part
20 . . . protruding part
21 . . . inclined part
22 . . . guide part
23 . . . bottom part
26 . . . wall part
50 . . . worm gear
60 . . . worm wheel
71 . . . shaft
221 . . . first guide part
222 . . . second guide part
B1, B2 . . . edge part
B11 . . . first end part
B12 . . . second end part
C1 . . . central axis
E . . . meshing part
11, 12 . . . imaginary line

What is claimed is:
1. A worm reducer, comprising:
a housing filled with grease that lubricates the worm reducer;
a worm gear supported by a bearing in the housing;
a worm wheel that meshes with the worm gear; and
a shaft that has a central axis coincident with a rotational axis of the worm wheel;
wherein the housing includes an upper surface part and a lower surface part that faces parallel to the upper surface part by interposing the worm wheel;
wherein at least one of the upper surface part or the lower surface part includes a protruding part protruding toward the worm wheel;
wherein, an entirety of the protruding part being provided between the central axis of the shaft and a meshing region between the worm gear and the worm wheel in a plan view, the protruding part including an inclined portion inclining toward the meshing region;

wherein the protruding part includes a guide portion that guides lubricant toward the worm gear;
wherein the protruding part includes a bottom portion protruding from the guide portion toward a side of the shaft;
wherein the guide portion is positioned between the bottom portion and the upper or lower surface part, and includes a first guide portion on a side of the bottom portion and a second guide portion on a side of the upper or lower surface part;
wherein, in the guide portion,
a curvature of the first guide portion is larger than a curvature of the second guide portion on a shaft side of the guide portion nearer to the shaft, and
the curvature of the second guide portion is larger than the curvature of the first guide portion on a worm gear side of the guide portion nearer to the worm gear.

2. The worm reducer according to claim 1, wherein the closer to the worm gear, the larger a proportion of an area of the second guide portion to a proportion of an area of the first guide portion.

3. The worm reducer according to claim 1, wherein
the protruding part includes:
an edge portion where the bottom portion and the guide portion intersect;
a first end portion that is an end on the shaft side of the edge portion nearer to the shaft; and
a second end portion that is an end on the worm gear side of the edge portion nearer to the worm gear,
wherein the protruding part is curved toward a side of the central axis of the shaft from an imaginary line connecting the first end part-portion and the second end part portion.

4. The worm reducer according to claim 3,
wherein the edge portion includes at least two sections having different curvatures, and
wherein curvature of the section of the edge portion including the first end portion is larger than curvature of the section of the edge portion including the second end portion.

5. The worm reducer according to claim 1, wherein the protruding part includes a wall portion that extends in a direction away from the worm wheel, from an apex of the bottom portion, on a side of the central axis of the shaft.

6. The worm reducer according to claim 5, wherein the wall portion is curved in a direction away from the central axis.

7. The worm reducer according to claim 6, wherein a pair of ends connecting the guide portion and the wall portion are positioned outward from an outer circumference of the shaft.

8. The worm reducer according to claim 6, wherein ends connecting the guide portion and the wall portion are positioned outward from ends of the meshing region between the worm gear and the worm wheel.

9. A worm reducer, comprising:
a housing filled with grease that lubricates the worm reducer;
a worm gear supported by a bearing in the housing;
a worm wheel that meshes with the worm gear; and
a shaft that has a central axis coincident with a rotational axis of the worm wheel;
wherein the housing includes an upper surface part and a lower surface part that faces parallel to the upper surface part by interposing the worm wheel;
wherein at least one of the upper surface part or the lower surface part includes a protruding part protruding toward the worm wheel;
wherein, an entirety of the protruding part is provided closer to a side of the worm gear than the central axis of the shaft in a plan view, and at least a portion of the protruding part is arranged on a straight line passing through the central axis of the shaft and being perpendicular to the rotational axis of the worm wheel;
wherein the protruding part includes a guide portion that guides lubricant toward the worm gear;
wherein the protruding part includes a bottom portion protruding from the guide portion toward a side of the shaft, and
wherein the guide portion is positioned between the bottom portion and the upper or lower surface part, and includes a first guide portion on a side of the bottom portion and a second guide portion on a side of the upper or lower surface part;
wherein, in the guide portion,
curvature of the first guide portion is larger than curvature of the second guide portion on a shaft side of the guide portion nearer to the shaft, and
the curvature of the second guide portion is larger than the curvature of the first guide portion on a worm gear side of the guide portion nearer to the worm gear.

10. A worm reducer, comprising:
a housing filled with grease that lubricates the worm reducer;
a worm gear supported by a bearing in the housing;
a worm wheel that meshes with the worm gear; and
a shaft that has a central axis coincident with a rotational axis of the worm wheel;
wherein the housing includes an upper surface part and a lower surface part that faces parallel to the upper surface part by interposing the worm wheel;
wherein at least one of the upper surface part or the lower surface part includes a protruding part protruding toward the worm wheel;
wherein, an entirety of the protruding part being provided between the central axis of the shaft and a meshing region between the worm gear and the worm wheel in a plan view, the protruding part including an inclined portion inclining toward the meshing region;
wherein the protruding part includes a guide portion that guides lubricant toward the worm gear;
wherein the protruding part includes a bottom portion protruding from the guide portion toward a side of the shaft;
wherein the guide portion is positioned between the bottom portion and the upper or lower surface part, and includes a first guide portion on a side of the bottom portion and a second guide portion on a side of the upper or lower surface part,
wherein
the protruding part includes:
an edge portion where the bottom portion and the guide portion intersect;
a first end portion that is an end on a shaft side of the edge portion nearer to the shaft; and
a second end portion that is an end on a worm gear side of the edge portion nearer to the worm gear,
wherein the protruding part is curved toward a side of the central axis of the shaft from an imaginary line connecting the first end portion and the second end portion.

* * * * *